M. P. P. RIIS.
PROCESS OF PURIFYING GAS.
APPLICATION FILED OCT. 21, 1914.

1,156,022. Patented Oct. 5, 1915.

WITNESSES:
O. Johnson
Frank Warren

INVENTOR
Marius P. P. Riis
BY
C. D. Haskins
ATTORNEY

UNITED STATES PATENT OFFICE.

MARIUS P. P. RIIS, OF SEATTLE, WASHINGTON.

PROCESS OF PURIFYING GAS.

1,156,022. Specification of Letters Patent. Patented Oct. 5, 1915.

Application filed October 21, 1914. Serial No. 867,696.

*To all whom it may concern:*

Be it known that I, Marius P. P. Riis, citizen of the United States, residing at Seattle, in the county of King and State of Washington, have invented a certain new and useful Improvement in Processes of Purifying Gas, of which the following is a specification.

My invention relates to improvements in processes of purifying gas and the object of my improvement is to provide a process of purifying gas that is generated in retorts by the destructive distillation of wood, coal or other combustible material whereby such gas, in the course of its flow from the generating apparatus to the gas-holder, in which it is to be stored, may be subjected to a contact with lime water, thence successively to percolate and pass through the several compartments of a scrubber containing certain different materials which serve to absorb and retain nearly all of the impurities of such gas whereby such gas may be delivered into such gas-holder as "permanent" gas that may be used for producing light, heat and power.

I attain this object by the use of devices illustrated in the accompanying drawings, wherein—

Figure 1:
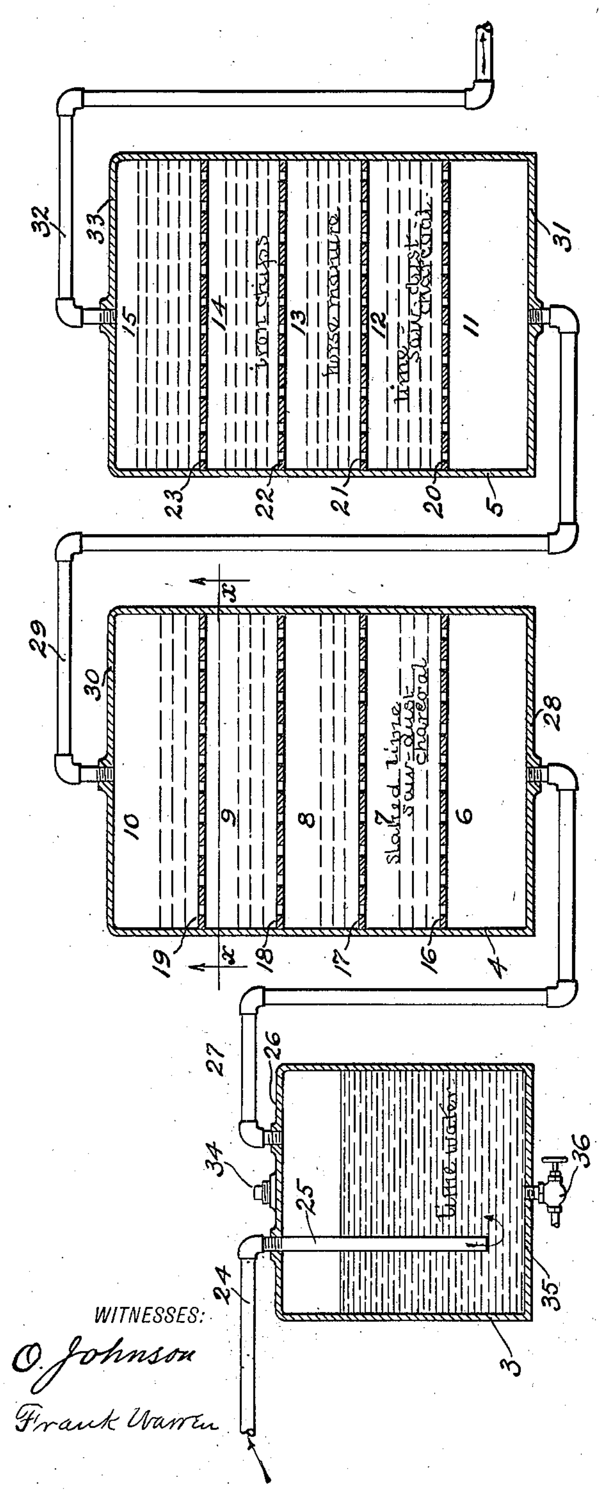
Figure 2:
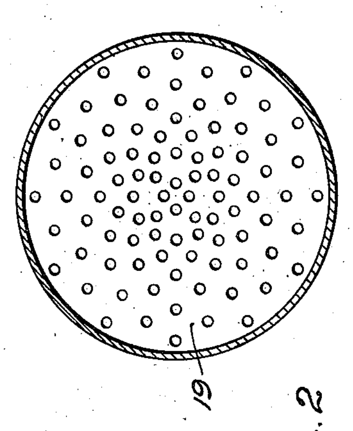

Figure 1 shows three cylindrically formed inclosures by a view in vertical midsection all of which inclosures are connected together by pipes shown in side elevation, while Fig. 2 by a view in cross-section on broken line $x$, $x$ of Fig. 1, illustrates a detail embodied in each of two of the inclosures shown in Fig. 1.

Referring to the drawings, throughout which like reference numerals indicate like parts, 3 is a tank-like inclosure of cylindrical form that is adapted to contain liquid while 4 and 5 are each larger inclosures of like cylindrical form having a plurality of compartments 6, 7, 8, 9 and 10, and 11, 12, 13, 14, and 15 respectively, which compartments are separated by partitions 16, 17, 18 and 19, and 20, 21, 22 and 23 respectively, which partitions are all perforated by numerous small holes, as more clearly shown in Fig. 2.

Leading from a gas generator (not shown) is a conducting pipe 24 which connects with a pipe 25 that is disposed to extend through the top wall 26 of the inclosure 3 to project downwardly into the bottom portion of said inclosure 3, while a pipe 27 is disposed to form a passage-way from the upper portion of the space within the inclosure 3 through the top wall 26, thence to and through the bottom wall 28 of the inclosure 4, while a pipe 29 is disposed to form a passage-way through the top wall 30, thence to and through the bottom wall 31 of the inclosure 5, and a pipe 32 is disposed to form a passageway through the top wall 33 of the inclosure 5, thence to a storage gas-holder (not shown).

In the top wall 26 of the inclosure 3 is an inlet passage-way which is normally closed by a plug 34 through which passage-way liquid may be introduced into said inclosure 3 while in the bottom wall 35 is an outlet passage-way normally closed by a valve 36 through which passage-way liquid may be permitted to flow upon opening said valve 36 to remove old liquid in the operation of renewing the liquid employed in my process. In such structure gas may flow from a gas generator through the pipe 24 into the bottom of the inclosure 3, thence upwardly to and through the pipe 27 and into the bottom portion of the bottom compartment 6 of the inclosure 4, thence upwardly through the perforations in the several partitions 16, 17, 18 and 19, thence from the upper portion of the compartment 10 into and through the pipe, 29 through the bottom wall 31 of the inclosure 5 into the compartment 11, thence upwardly through the perforations in the several partitions 20, 21, 22 and 23 to the compartment 15, thence outwardly through the top wall 33 to the pipe 32, thence through said pipe 32 to the storage gas-holder (not shown.)

In utilizing the structure thus illustrated and described the plug 34 is removed from the hole in the top of the inclosure 3 and a sufficient amount of water is introduced through such hole to cause the surface of such water to rise nearly to the top of the inclosure, as indicated in Fig. 1, and to such water, preferably I add slaked lime in the proportion of approximately one pound to six gallons of water, but good results may be obtained without lime and thereupon the plug 34 is replaced to close tightly the hole through the top wall 26, thus gas passing from pipe 24 to the pipe 27 through the space within the inclosure 23 is washed by the water through which it rises from the lower end of the pipe 25 to find its way to the entrance of pipe 27 and in its passage through such water the less volatile portions of the impurities contained in the gas, as tar, ammonia, creosote and the like, are condensed to be absorbed and retained by such water, only the more volatile portions of such impurities entering the pipe 27 to pass into the lowest compartment 6 of the inclosure 4.

Upon each of the perforated partitions 16, 17, 18 and 19 are disposed first a layer of absorbent material consisting of granulated charcoal, then on top of the charcoal is a layer of sawdust, then upon the top of the sawdust is a thinner layer of slaked lime, such layers of charcoal, sawdust and lime on each of said partitions forming stratas which are indicated by the three broken lines in each of the compartments 7, 8, 9 and 10 of the inclosure 4, thus the gas under sufficient pressure rises upwardly from the compartment 6 through the perforations in the partition 16, thence to percolate through the layers of charcoal, sawdust and lime in the compartment 7, thence to pass through the perforations in the partitions 17 and through the layers of like absorbent material in compartment 8, thence in like manner through the perforations of partitions 18 and 19 and through the layers of absorbent material contained respectively in compartments 9 and 10 and from the upper portion of the compartment 10, the gas passes into the pipe 29 and in its passage through the several compartments between the compartment 6 and the pipe 29, the several layers of absorbent material named, through which it percolates and serves to extract and absorb a large proportion of the impurities which is yet contained in the gas as it leaves the compartment 6 to find its way to the pipe 29. The gas now continuing its course through pipe 29 finds its way into the bottom portion of compartment 11 of inclosure 5 and then passes upwardly and successively through the perforated partitions 20, 21, 22 and 23 and through compartments 12, 13, 14 and 15, respectively, to reach and enter the pipe 32.

On the top surface of the perforated partition 20 are disposed first a layer of granulated charcoal, then a layer of sawdust, then a layer of slaked lime and upon the partition 21 is disposed a layer of horse manure and on partition 22 is disposed a layer of rusty iron chips or iron shavings, and on partition 23 is disposed a layer of sawdust or granulated charcoal, then a layer of slaked lime over which is placed a covering of burlap or like coarse loosely woven fabric, and on the top of such burlap covering is sprinkled first a thin coating of sulfate of copper (known as blue vitriol), then upon the top of such coating of sulfate of zinc, and upon such coating of sulfate of zinc is sprinkled a thin coating of sulfate of iron, and upon the top of such coating of sulfate of iron is sprinkled a layer or coating of anhydrous cupric sulfate; and the gas percolating upwardly through the several compartments 12, 13, 14 and 15, and through the layers of the several materials named, is acted upon by such materials to extract and absorb impurities as are contained in it when it enters the lowest compartment 11 of the inclosure 5.

With respect to the materials blue vitriol, sulfate of zinc, sulfate of iron and anhydrous cupric sulfate, such materials are used in equal quantities and they may be placed on the burlap covering in any order or they may be all thoroughly mixed together and then the mixture disposed on the burlap covering, but in practice I prefer to place them in layers in the order named.

I have found by experiment that the layer of horse manure in each of the compartments is wonderfully effective in serving to condense and absorb the vapor or fumes of ammonia with the result that little if any ammonia passes into the pipe 32 to reach the storage gas-holder (not shown).

I have not thought it necessary to illustrate the details of construction whereby the several perforated partitions together with the top walls of the inclosures 4 and 5 may be removed and replaced in the operation of charging the several compartments with the layers of purifying materials, since I make no claims for the apparatus employed in my process and since such details of construction may be designed by any workman skilled in sheet metal work. Of course, I do not restrict myself to the employment of any particular number of compartments in the inclosures 4 and 5 nor do I restrict myself to the use of a single inclosure 3 wherein water or a solution of lime water is used for condensing and retaining the more volatile impurities.

What I claim is:—

1. The process of purifying gas consisting in causing such gas first, to pass from the generator to a water tank, thence to bubble upwardly through said body of water and pass into a second purifying tank containing successive layers of different purifying materials, to wit: charcoal, sawdust and slaked lime, thence to pass into a third purifying tank containing successive layers of purifying materials, first to wit: charcoal, sawdust, and slaked lime; secondly, horse manure; thirdly rusted iron chips, the top layer comprising a mixture of sawdust and slaked lime, and a covering of burlap, and finally passing through a mixture of sulfate of copper, sulfate of zinc, sulfate of iron and anhydrous cupric sulfate, and thence to a storage gas-holder.

2. The process of purifying gas consisting in causing such gas to percolate through a scrubber embodying purifying materials including charcoal, sawdust, slaked lime, horse manure, rusted iron chips, blue vitriol, sulfate of zinc, sulfate of iron and anhydrous cupric sulfate.

3. The process of purifying gas consisting in causing gas to first pass through a solution of water and lime, then passing through successive layers, each consisting of charcoal, sawdust, and slaked lime, then to pass through successive layers of horse manure, rusty iron chips, and finally through a layer formed of sawdust, slaked lime, a burlap covering, and sulfates of zinc, copper and iron.

4. The process of purifying gas consisting in causing gas to first pass through a body of water, subsequently to pass through distinct layers formed of charcoal, sawdust and slaked lime, then to pass through horse manure, rusty iron chips, and sulfates of zinc, iron and copper, and anhydrous cupric sulfate.

In testimony whereof, I affix my signature in the presence of two witnesses.

MARIUS P. P. RIIS.

Witnesses:
F. C. MATHENY,
FRANK WARREN.